United States Patent [19]

Ludwig et al.

[11] Patent Number: 5,436,017

[45] Date of Patent: * Jul. 25, 1995

[54] METHOD OF INHIBITING BACTERIAL GROWTH IN MEAT AND PRODUCT THEREOF

[75] Inventors: Wolfgang Ludwig, Highland, N.Y.; Siddik Iyimen, Neunkirchen, Germany

[73] Assignees: WTI Inc., Highland, N.Y.; Myac Fleischtechnologie GmbH, Neunkirchen-Saar, Germany

[*] Notice: The portion of the term of this patent subsequent to Apr. 12, 2011 has been disclaimed.

[21] Appl. No.: 190,652

[22] Filed: Feb. 1, 1994

Related U.S. Application Data

[63] Continuation-in-part of Ser. No. 983,636, Dec. 1, 1992, Pat. No. 5,302,406.

[51] Int. Cl.$^6$ .................... A23L 1/314; A23L 1/315; A23B 4/20

[52] U.S. Cl. .................... 426/281; 426/332; 426/335; 426/532; 426/641; 426/644

[58] Field of Search ............... 426/281, 332, 335, 532, 426/641, 644, 652

[56] References Cited

U.S. PATENT DOCUMENTS

| | | | |
|---|---|---|---|
| 2,117,478 | 5/1938 | Hall | 426/652 X |
| 3,065,084 | 11/1962 | Melniek et al. | 426/332 |
| 4,075,357 | 2/1978 | Szezesniak et al. | 426/332 |
| 4,476,112 | 10/1984 | Awersano | 426/332 X |
| 5,028,444 | 7/1991 | Yamamoto et al. | 426/652 X |
| 5,223,302 | 6/1993 | Coccodrilli et al. | 426/646 |

FOREIGN PATENT DOCUMENTS

| 47-37020 | 9/1972 | Japan | 426/643 |
|---|---|---|---|

Primary Examiner—Arthur L. Corbin
Attorney, Agent, or Firm—Herbert Dubno

[57] ABSTRACT

A method of inhibiting bacterial growth in meat in which sodium citrate buffered with citric acid is introduced into the meat to a sodium citrate content of 1 to 7%, and preferably about 1 to 1.3%.

15 Claims, No Drawings

METHOD OF INHIBITING BACTERIAL GROWTH IN MEAT AND PRODUCT THEREOF

CROSS REFERENCE TO RELATED APPLICATION

This application is a continuation in part of Ser. No. 07/983,636 filed 1 Dec. 1992, now U.S. Pat. No. 5,302,406.

FIELD OF THE INVENTION

Our present invention relates to a method of inhibiting bacterial growth in meat and, more particularly, to a method of improving the long term storage capacity for red meats and poultry.

BACKGROUND OF THE INVENTION

In U.S. Pat. Nos. 5,017,391, 4,888,191 and 4,798,729, as well as in the prior art described in these patents, it is pointed out that sodium lactate can be added to meat products such as ham and sausage in amounts of 1 to 3% to poultry and fish in an amount of 1 to 7% to improve the resistance of the meat to bacterial growth and particularly to control *Clostridium botulinum* which can occur in meats and poultries which are packaged and cooked, but not sterilized.

The *Clostridium botulinum* can grow in such meats and produce a toxin. As a consequence, it is desirable or necessary to somehow control the growth of bacteria in meat, including red meats such as hams, and poultry, or to sterilize the meat if the meat is to be subject to storage.

It should also be noted that citric acid and sodium citrate are generally recognized as safe in foodstuffs and are on the GRAS list issued by the Food and Drug Administration. Finally, mention should be made of the fact that sodium citrate in an amount up to 0.3% by weight of the meat, is approved as a curing accelerator. The sodium citrate can be added as a part of the curing process of cured meats such as ham. Nevertheless, it is desirable to improve the appearance, flavor retention and storage life of meats and, specifically, to provide improved ways of limiting bacterial growth generally and the growth of *Clostridium botulinum* in particular.

OBJECTS OF THE INVENTION

It is the principal object of the present invention to provide an improved method of inhibiting bacterial growth in meat, both red meats and poultry and cured meats and noncured meats, with advantages over prior art systems.

Another object of the invention is to provide a method for the purposes described which eliminates the need to introduce sodium lactate into the meat.

Still another object of the invention is to provide a meat product with enhanced storage capacity and resistance to bacterial growth.

DETAILED DESCRIPTION OF THE INVENTION

These objects and others which will become apparent hereinafter are attained, in accordance with the present invention in a method of inhibiting bacterial growth in red meat and poultry which comprises injecting the meat with an aqueous solution of sodium citrate to a sodium citrate level in the meat of 1 to 7% by weight, especially 1 to 3% by weight, and preferably 1 to 1.3% by weight thereof.

Advantageously the sodium citrate is in the form of a buffer solution of citric acid and sodium citrate in water which has been diluted for this purpose.

We have found, surprisingly, that at levels of about 1.2 to 1.3% of sodium citrate in the meat, the bacterial growth inhibition is equal to or better than that of sodium lactate and the properties of the meat are significantly better with respect to color, flavor retention and the like. Accordingly, the method of the invention provides a substantially improved meat product with comparatively long storage life, excellent inhibition of bacterial growth, especially with respect to *Clostridium botulinum*, without creating any health problems.

The sodium citrate solution is preferably injected at a solution concentration of sodium citrate which will not denature meat protein. While injection of the sodium citrate solution can be effected as a separate step, preferably the sodium citrate solution is added to the brine which may be injected into the meat or to the solution in which the meat is tumbled as part of a standard curing process for massaging into the meat. In that case, an aqueous solution containing 45% to 80% of saturation, especially about 50% to 60% of saturation and particularly 50% of saturation of sodium citrate, buffered with citric acid to a pH of 5.6, for example may be used as the tumbling solution.

In general a pH between 5.4 and 5.8 was found to be desirable.

Preferably the stock solution is diluted with water so that the sodium citrate solution injected or massaged into the meat has a sodium citrate concentration of about 5 to 20% and most preferably about 8 to 12%.

In a preferred or best mode of operation, half of the sodium citrate added to the meat is injected with the brine, while the other half is massaged into the meat in the subsequent tumbling operation.

SPECIFIC EXAMPLES

Example 1

A side by side comparative test was made with hams injected with sodium lactate (for comparison) in accordance with the examples used in U.S. Pat. No. 4,798,729 for turkey breasts, and hams injected with 1.2 to 1.3% sodium citrate by diluting a sodium citrate buffer solution containing citric acid and injecting the resulting solution. The aqueous solution contained 50% of saturation of sodium citrate and was buffered to a pH of 5.6 as described.

The hams had substantially the same storage capacity and equivalent inhibition of *Clostridium botulinum* growth but the appearance and flavor retention of the hams containing the sodium citrate was significantly better than the equivalent properties of the ham containing the sodium lactate.

Example 2

The aqueous solution containing 50% of saturation of sodium citrate buffered with citric acid to a pH of 5.6, was used in the processing of hams as described in Example 1 with variation in the percentage of sodium citrate incorporated in the ham by the injection and massaging.

At about 1% sodium citrate in the meat, a significant bacterial inhibition was observed which reached a maximum in terms of the shelf life per quantity of sodium citrate incorporated in the range of about 1.2 to 1.3%.

An increase in the sodium citrate incorporated into the meat to about 2% did not materially increase the shelf life, although a slight increase was observed and no significant detriment to the increased sodium citrate level was noted. With an increase in the incorporation of sodium citrate to about 3%, the shelf life increased additionally only slightly and the flavor or taste of the meat appeared to be affected to a certain extent, although the affect on taste and flavor was not detrimental to the point that the meat was unsatisfactory.

Increasing the sodium citrate to 7% by weight in the meat did not alter the shelf life characteristics significantly and was characterized by a more noticeable affect on the taste or flavor.

The increased concentrations of sodium citrate in the meat were obtained by massaging the meat in the solution for longer periods of time.

The buffered sodium citrate solution was diluted to a sodium citrate concentration of about 10% in these tests.

Substantially identical results were obtained with a stock sodium citrate solution buffered to a pH of about 5.6 but containing 60% sodium citrate. Indeed, sodium citrate concentrations in the stock solution of 45 to 80% with pH of substantially 5.4 to 5.8 were found to be satisfactory and to reproduce essentially the same results.

We claim:

1. A method of inhibiting bacterial growth and retaining flavor in red meat or poultry which comprises the step of injecting into the red meat or poultry or massaging into the red meat or poultry a composition consisting essentially of an aqueous solution of sodium citrate, buffered with citric acid to a pH of about 5.4 to about 5.8 and derived from a stock solution containing 45 to 80% saturation of sodium citrate to bring the sodium citrate content in the red meat or poultry to 1 to 7% by weight to reduce bacterial growth and retain flavor during storage of the red meat or poultry.

2. The method defined in claim 1 wherein said stock solution is diluted with water to provide a sodium citrate concentration in the solution injected into said red meat or poultry to about 5 to 20%.

3. The method defined in claim 2 wherein said concentration is about 8 to 12%.

4. The method defined in claim 1 wherein said solution is injected or massaged into the red meat or poultry to bring the sodium citrate content of the red meat or poultry to 1 to 3%.

5. The method defined in claim 1 wherein said solution is injected or massaged into the red meat or poultry to bring the sodium citrate content of the red meat or poultry to 1 to 1.3%.

6. The method defined in claim 1 wherein said pH is about 5.6.

7. A processed red meat or poultry product, stabilized against bacterial growth and having retained flavor, produced by injecting into red meat or poultry or massaging into red meat or poultry a composition consisting essentially of an aqueous citrate solution, derived from a stock solution containing 45% to 80% saturation of sodium citrate, buffered with citric acid to a pH of 5.4 to 5.8 so that the sodium citrate content in the red meat or poultry is 1 to 7%.

8. The processed red meat or poultry product defined in claim 7 which contains substantially 1 to 3% sodium citrate.

9. The processed red meat or poultry product defined in claim 8 which contains substantially 1 to 1.3% sodium citrate.

10. A method of inhibiting bacterial growth and retaining flavor in red meat or poultry which comprises the steps of:
    (a) injecting into the red meat or poultry a composition consisting essentially of an aqueous solution of sodium citrate buffered with citric acid to a pH of about 5.4 to about 5.8 and derived from a stock solution containing 45 to 80% saturation of sodium citrate; and then
    (b) massaging the red meat or poultry in a subsequent tumbling operation with an additional composition consisting essentially of an aqueous solution of sodium citrate, buffered with citric acid to a pH of about 5.4 to about 5.8 so that the sodium citrate content in the red meat or poultry is brought to 1 to 7% to reduce bacterial growth and retain flavor during storage of the red meat or poultry.

11. The method defined in claim 10 wherein the sodium citrate content of the red meat or poultry is brought to about 1 to 3% following step (b).

12. The method defined in claim 11 wherein the sodium citrate content is brought to about 1.0 to about 1.3% following step (b).

13. The method defined in claim 10 wherein said stock solution contains about 50 to 60% saturation of sodium citrate.

14. The method defined in claim 13 wherein said stock solution contains about 50% saturation of sodium citrate.

15. The method defined in claim 10 wherein said pH is 5.6.

* * * * *